April 14, 1925.  M. D. KAST  1,533,918
WEEDER
Filed July 25, 1922  2 Sheets-Sheet 2

WITNESSES

INVENTOR
Morgan D. Kast
BY
ATTORNEYS

Patented Apr. 14, 1925.

1,533,918

UNITED STATES PATENT OFFICE.

MORGAN D. KAST, OF PENDLETON, OREGON.

WEEDER.

Application filed July 25, 1922. Serial No. 577,294.

*To all whom it may concern:*

Be it known that I, MORGAN D. KAST, a citizen of the United States, and a resident of Pendleton, in the county of Umatilla, State of Oregon, have invented a new and Improved Weeder, of which the following is a full, clear, and exact description.

This invention relates to improvements in weeders, an object of the invention being to provide a weeder of exceptionally light draft, and which is capable of adjustment so that the blades may cut at any desired depth.

A further object is to provide a weeder comprising a plurality of independently operable and adjustable sections embodying novelty of construction and operation.

With these and other objects in view, the invention consists in certain novel features of construction and combinations, and arrangement of parts, as will be more fully hereinafter described and pointed out in the claims.

In the accompanying drawings—

Figure 1:
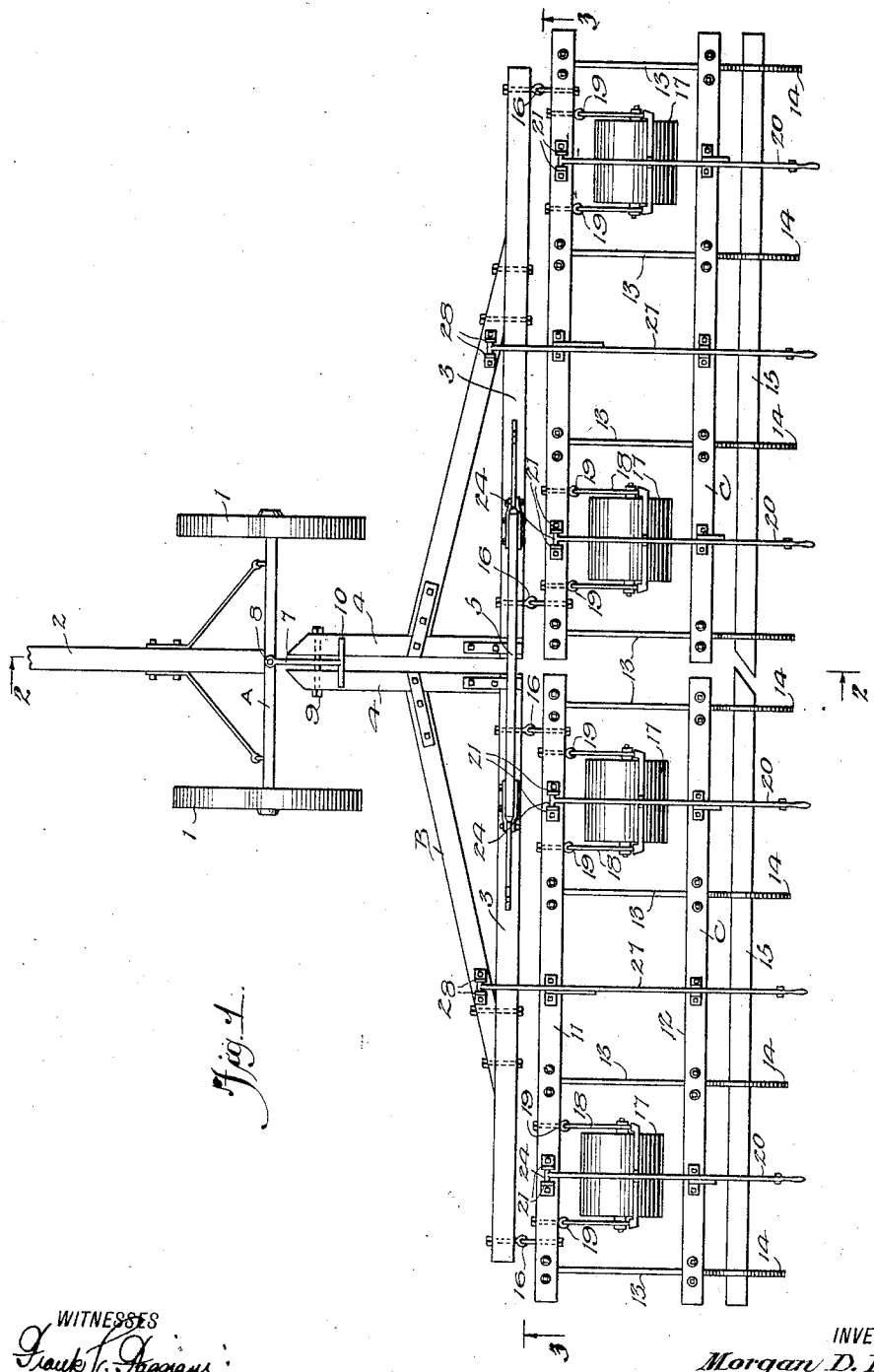
Figure 1 is a plan view of my improved weeder.

A represents a truck, B a coupling frame and C, C, my improved weeder frames. These parts A, B and C constitute the main elements of my improved weeder and will now be described in detail.

The truck A has a pair of wheels 1, 1, and a tongue 2 for the attachment of draft animals or a tractor.

The coupling frame B comprises two sections 3, 3, having a pair of parallel longitudinal bars 4, 4 and the sections strengthened and held rigid by a bar 5 which is secured at its respective ends by brackets 6, to the respective sections 3, 3, thus firmly connecting the sections and maintaining the bars 4, 4 in parallelism.

Figure 2:
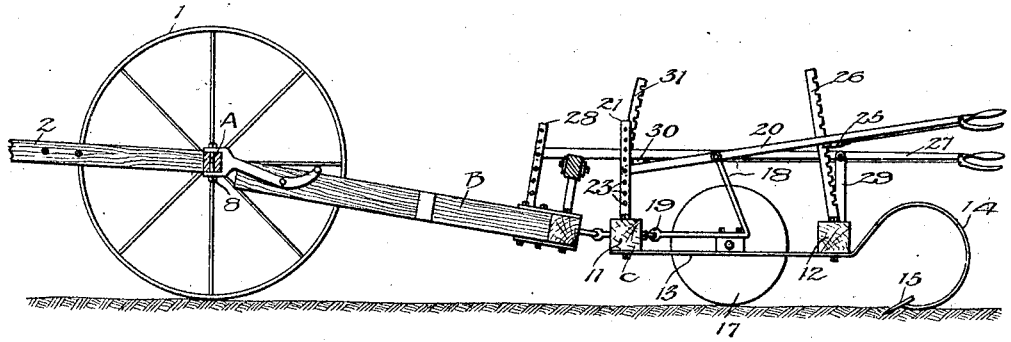
Figure 2 is a view in longitudinal section on the center line 2—2, of Figure 1.
Figure 3:
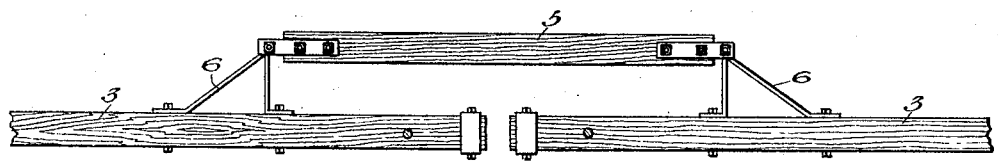
Figure 3 is a fragmentary view taken on the section line 3—3, of Figure 1.

A coupling 7 connects truck A, and frame B. This coupling 7 at its forward end is pivotally connected as shown at 8 to the truck A to permit the truck lateral pivotal movement. The coupling 7 between its ends is pivotally connected to the bars 4, 4 by a bolt 9, and said coupling 7 normally projects between the bars 4 and at its upper end has a cross head 10 resting on top of the bars 4, 4 as shown most clearly in figures 1 and 2.

The weeder frames C, C, are precisely alike and independent of each other, and the description hereinafter of one frame C will apply alike to both. Each frame C comprises parallel bars 11 and 12 which are connected at their under faces by spring strips 13, said strips at their rear ends being arched as shown at 14, and at their lower rear ends secured to blades 15, which cut the weeds as will be readily understood.

The forward bars 11 of the weeder frame C, are pivotally connected to the coupling frame B by eye bolts 16 to allow a free pivotal movement of the weeder frames relative to the coupling frame.

Rollers 17 support the weeder frames, and these rollers are fixed to pivoted frames 18, the latter being of general U shape in plan and angular shaped in side elevation, and pivotally connected to the front bars 11 of the weeder frames by eye bolts 19. The rollers 17 and their frames 18 are adjusted vertically with relation to the weeder frames by means of hand levers 20. These hand levers 20 are fulcrumed between parallel posts 21 on the front bars 11 of the weeder frames C, and are adjustable vertically to said posts preferably by providing a series of perforations 23 in which the fulcrums 24 of the levers may be positioned. These levers 20 are provided with spring pressed detents 25 which engage notched racks 26 on the rear bars 12 of the weeder frame C to hold the rollers in any desired position of adjustment relative to the weeder frames and thereby control the depth of the blades in operation.

To permit raising and lowering of the respective weeder frames to discharge the weeds collected by the blades, I provide each weeder frame with a lifting lever 27. These levers 27 are adjustably fulcrumed at their forward ends to posts 28 on coupling frames B and at a point near their rear ends are pivotally connected to posts 29 on the rear bars 12 of the weeder frames.

Spring pressed detents 30 are provided on the levers 27 to engage notched segments 31 on the front bars 11 of the weeder frames to hold the weeder frames in lowered position, and it is to be understood that these detents 30 must be released from their segments 31 before the weeder frames can be elevated.

The operation is as follows;

By adjusting the elevation of the rollers 17 through the medium of their adjusting levers 20, the depth of cutting of the blades 15 can be adjusted; as the weeder is drawn over the ground, the blades 15 will cut the weeds and as the weeds accumulate on the blades, they can from time to time be dumped by operating the levers 27 as above explained.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

I claim:

1. A weeder comprising a coupling frame, a pair of weeder frames pivotally connected to the coupling frame and supporting the same, rollers mounted within the weeder frames, cutting blades carried by the weeder frames, means for independently adjusting each of the rollers to regulate the depth of the blades, and means for independently dumping each weeder frame.

2. A weeder comprising a pair of weeder frames, a coupling frame, rollers mounted within the weeder frames and having their frames pivotally connected thereto, levers for adjusting each of the roller frames relative to the weeder frames, and levers for raising and lowering each weeder frame independently.

3. A weeder comprising a pair of weeder frames, a coupling frame, rollers mounted within the weeder frames and pivotally connected thereto, levers for adjusting each of the roller frames relative to the weeder frames, levers for raising and lowering each weeder frame independently, notched racks, and detents on the levers for securing the levers from positions of adjustment.

4. A weeder, comprising a pair of weeder frames, a coupling frame, spring strips on the weeder frames projecting rearwardly beyond the same and having arched formation, blades secured to the rear end of said strips, rollers pivotally connected to the weeder frames and supporting the latter, posts on the weeder frames, racks on the weeder frames, levers fulcrumed to said posts and connected to the roller mounting whereby the rollers can be adjusted vertically relative to the weeder frames, and detents on the levers engaging the racks.

5. A weeder, comprising a pair of weeder frames, a coupling frame, spring strips on the weeder frames projecting rearwardly beyond the same and having arched formation, blades secured to the rear end of said strips, rollers pivotally connected to the weeder frames and supporting the latter, posts on the weeder frames, racks on the weeder frames, levers fulcrumed to said posts and connected to the roller mounting whereby the rollers can be adjusted vertically relative to the weeder frames, detents on the levers engaging the racks, posts on the coupling frame and weeder frames, levers pivotally connected to the posts and adapted to elevate the weeder frames for dumping, and means for locking said last mentioned levers in positions of adjustment.

6. In a weeder, a frame provided with posts, cutting blades carried by the frame, frames pivoted to and within the first frame, rollers mounted in said frames, levers pivoted intermediate of their ends to the roller frames and each have one end pivoted to one post, and means for adjustably locking the levers to the other posts.

7. In a weeder, the combination of a coupling frame provided with a post, a weeder frame provided with front and rear posts, cutting blades carried by the weeder frame, a lever pivoted to the post of the coupling frame and to the rear post of the weeder frame, and means for adjustably locking the lever to the front post of the weeder frame.

MORGAN D. KAST.